United States Patent [19]

Raehse et al.

[11] Patent Number: 5,637,560
[45] Date of Patent: Jun. 10, 1997

[54] PROCESS FOR THE PRODUCTION OF SURFACE-ACTIVE ANIONIC SURFACTANT SALTS USING SUPERHEATED STEAM

[75] Inventors: Wilfried Raehse, Duesseldorf; Johann Fues, Grevenbroich, both of Germany

[73] Assignee: Henkel Kommanditgesellschaft auf Aktien, Duesseldorf, Germany

[21] Appl. No.: 613,395

[22] Filed: Mar. 11, 1996

Related U.S. Application Data

[63] Continuation of Ser. No. 284,699, filed as PCT/EP93/00262, Feb. 4, 1993, abandoned.

[30] Foreign Application Priority Data

| Feb. 12, 1992 | [DE] | Germany | 42 04 090.6 |
| Feb. 12, 1992 | [DE] | Germany | 42 04 035.3 |
| Feb. 27, 1992 | [DE] | Germany | 42 06 050.8 |
| Mar. 2, 1992 | [DE] | Germany | 42 06 521.6 |
| Mar. 2, 1992 | [DE] | Germany | 42 06 495.3 |
| Mar. 19, 1992 | [DE] | Germany | 42 08 773.2 |
| Mar. 24, 1992 | [DE] | Germany | 42 09 434.8 |

[51] Int. Cl.$^6$ ............................ C11D 11/02; B01D 1/18
[52] U.S. Cl. .................... 510/443; 510/452; 510/457; 510/469; 510/488; 510/491; 510/495; 510/470; 510/475; 510/536; 252/353; 252/354; 252/356; 252/367.1; 159/4.4; 159/48.1
[58] Field of Search ....................... 252/89.1, 109, 252/549, 550, 551, 174, 174.23, 174.24, DIG. 2, 367.1, 353, 354, 356; 159/4.4, 48.1, DIG. 10; 510/443, 452, 457, 469, 495, 536; 34/411, 372

[56] References Cited

U.S. PATENT DOCUMENTS

| 4,171,243 | 10/1979 | Brooks et al. | 159/48 R |
| 4,376,010 | 3/1983 | Gauvin | 159/48.1 |
| 4,415,489 | 11/1983 | Kiczek et al. | 252/558 |
| 4,919,847 | 4/1990 | Barletta et al. | 252/558 |
| 5,189,207 | 2/1993 | Blasey et al. | 562/97 |
| 5,431,780 | 7/1995 | Raehse et al. | 510/443 |
| 5,536,430 | 7/1996 | Fues et al. | 510/443 |

FOREIGN PATENT DOCUMENTS

| 0319819 | 6/1989 | European Pat. Off. |
| 0402112 | 12/1990 | European Pat. Off. |
| 2412837 | 10/1974 | Germany. |
| 3936001 | 5/1991 | Germany. |
| 3941365 | 6/1991 | Germany. |
| 4030688 | 4/1992 | Germany. |
| 4204035 | 8/1993 | Germany. |
| 4204090 | 8/1993 | Germany. |
| 4206050 | 9/1993 | Germany. |
| 4206495 | 9/1993 | Germany. |
| 4206521 | 9/1993 | Germany. |
| 9205849 | 4/1992 | WIPO. |

OTHER PUBLICATIONS

Gehrman "Entwicklungstendenzen der Trocknungstechnik in der chemischen" Chem.–Ing–Tech. 62 (1990), Nr. 10, Seiten pp. 512–520.

*Primary Examiner*—Paul Lieberman
*Assistant Examiner*—Lorna M. Douyon
*Attorney, Agent, or Firm*—Ernest G. Szoke; Wayne C. Jaeschke; Real J. Grandmaison

[57] ABSTRACT

A process for the production of wetting-, washing- or cleaning-active anionic surfactant salts by reacting inorganic or organic bases with anionic surfactant intermediates containing hydrophilic negatively charged groups attached to hydrophobic hydrocarbon radicals. The salts are combined in a spray which is introduced into an inert gas phase of superheated steam whereby the spray is at least partly dried. In an embodiment of the process, the anionic surfactant intermediates are neutralized during the spraying step to form the salts.

20 Claims, No Drawings

PROCESS FOR THE PRODUCTION OF SURFACE-ACTIVE ANIONIC SURFACTANT SALTS USING SUPERHEATED STEAM

This application is a continuation of application Ser. No. 08/284,699 filed as PCT/EP93/00262 on Feb. 4, 1993, now abandoned.

BACKGROUND OF THE INVENTION

1. Field of the Invention

This invention relates to a process improved in several ways for the production of surface-active or interfacially active water-soluble, water-emulsifiable or water-dispersible anionic surfactant salts which may be used, for example, as useful materials in wetting agents, detergents and/or cleaning products. In the interests of simplicity, anionic surfactant salts of the type in question are referred to hereinafter as washing-active anionic surfactants or, quite simply, as anionic surfactants.

Washing-active anionic surfactants are important principal components or mixture components in any applications where interfacially active or surface-active auxiliaries are used. The anionic surfactants are generally used in admixture with other types of surfactants, more particularly anionic surfactants.

It is known that the class of anionic surfactants encompasses compounds in which hydrophobic hydrocarbon radicals are attached to hydrophilic, negatively charged groups which, in turn, are capable of salt formation. The most important representatives of the hydrophilic negatively charged groups are carboxyl groups and/or the residues of inorganic acids, more particularly sulfuric acid and/or phosphoric acid. The associated anionic surfactant classes include the carboxylates or soaps, the sulfates or the sulfonates, the phosphates or the phosphonates. In the numerous fields of application involving anionic surfactants of this type, overriding significance is attributed in particular to the sulfonates and sulfates in addition to the soaps. However, the effect of the anionic surfactants in practical application is also critically determined by the choice of the optimal salt-forming cations. In general, desirable representatives of these cations are those which lead to water-soluble or at least sufficiently water-emulsifiable or water-dispersible anionic surfactants. Overriding significance is again attributed here to the salts of the alkali metals, more particularly sodium and/or potassium, to the corresponding ammonium salts and/or to salts based on organically substituted ammonium ions. Accordingly, the synthesis of the anionic surfactant salts includes the neutralization—often as the last step—of the anionic surfactant intermediates still bearing acidic groups with suitable salt-forming inorganic and/or organic bases. Aqueous preparations of the bases, for example aqueous sodium hydroxide, which introduce water into the reaction product through their water content are frequently used for this purpose. Additional water is formed as a product of the salt-forming neutralization reaction. Accordingly, to obtain the anionic surfactant salts in dry form, subsequent drying is generally necessary. In addition, aqueous components in the anionic surfactant salt reaction product can be of different origin. Thus, the primary reaction products from the organic basic components and the associated acids, particularly inorganic acids, often have to be bleached in aqueous phase to obtain surfactants sufficiently light in color. Accordingly, the intermediate production of aqueous concentrates, which may often be present as aqueous pastes, is standard practice in the manufacture of modern anionic surfactants.

The conversion of these aqueous preparations of the anionic surfactants into powder-form or granulated dry products on an industrial scale is carried out by spray drying to form fine powders which can be agglomerated into relatively large agglomerates in a separate process step or even in a subsequent process step integrated into the drying stage. All this is generally known among experts.

Using this drying technology, one elegant solution to the problem of salt formation in the final stage of the synthesis of anionic surfactants is based on the principle of so-called spray neutralization. In this process, the two steps of neutralization using, above all, water-containing reactants both on the side of the anionic surfactant intermediates and on the side of the cation-yielding base components may be combined into a single step with the subsequent drying of the anionic surfactant salts formed. The components to be reacted with one another are sprayed and are mixed together in this form. The material accumulating may be delivered to a typical spray drying zone filled with hot gas, so that the salt-forming neutralization reaction and removal of the water used as auxiliary medium and the water formed by the neutralization reaction can ultimately be carried out in a single integral step.

The spray drying of aqueous preparations of useful materials of the type mentioned which are used on a large scale, for example as constituents of laundry detergents, has been carried out on an industrial scale for decades. Hot air and mixtures of air and hot waste combustion gases are used as the drying gas stream. Washing powders or useful materials and/or mixtures of useful materials for the production of laundry detergents in pourable and free-flowing powder form are obtained in corresponding spray-drying towers, generally at ambient pressure, in co-current or more frequently in countercurrent. Hitherto, the spray neutralization step with which the present invention is particularly concerned has been carried out in the same medium.

2. Discussion of Related Art

In their earlier application DE-A 40 30 688, applicants describe for the first time the use of superheated steam as the drying hot gas stream in the production of powder-form and, optionally, agglomerated useful materials or mixtures of useful materials for wetting agents, detergents and/or cleaning products of aqueous preparations thereof. Particular emphasis is also placed in this document on the corresponding drying of washing-active anionic surfactant salts with superheated steam. This new technology of drying components of wetting agents, detergents and/or cleaning products with superheated steam is further developed and optimized in a number of other applications, namely in applicants' earlier German patent applications P 42 04 035.3, P 42 04 090.6, P 42 06 050.8, P 42 06 521.6 and P 42 06 495.3. The disclosure of these earlier patents and patent applications is specifically included herein as part of the disclosure of the present invention.

The teaching according to the present invention as described hereinafter is based on applicants' knowledge of the drying of useful materials and mixtures of useful materials of the type in question with superheated steam as the drying gas, but at the same time goes a crucial step further which, to applicants' knowledge, has never been reported in the relevant literature. The essence of the further development according to the invention lies in the following: The inert conditions of a drying zone filled with superheated steam are now also to be utilized for the final process step involved in the production of the anionic surfactant salts. More particularly, the invention seeks to carry out the reaction of the anionic surfactant intermediates still bearing acidic groups with the salt-forming bases, more particularly aqueous gases, of inorganic and/or organic character under the protection afforded by the inert conditions of the zone filled with superheated steam. Accordingly, a greater function is assigned to the medium of the superheated steam, namely: the superheated steam serves as an inert reaction medium for the neutralization reaction. This does not in any way affect its suitability as transport medium for the drying process.

DESCRIPTION OF THE INVENTION

In a first embodiment, therefore, the present invention relates to a process for the production of wetting-, washing- and/or cleaning-active anionic surfactant salts by reaction of inorganic and/or organic bases with the associated anionic surfactant intermediates, which contain hydrophilic negatively charged groups attached to hydrophobic hydrocarbon radicals, in the course of spray neutralization, in which the anionic surfactant intermediates in the form of a sprayable formulation are finely sprayed into a gas phase and, at the same time, reacted with the bases and, preferably, at least partly dried. The process according to the invention is characterized in that the spray neutralization is carried out in superheated steam as the inert gas phase.

In another embodiment, the present invention relates to the use of superheated steam as inert gas and, at the same time, as a water-removing drying gas in the production of anionic surfactant salts of the type described above by reaction of the anionic surfactant intermediates with inorganic and/or organic bases.

In a modification of the process described above, the neutralization reaction of the bases with the associated anionic surfactant intermediates may initially be carried out in the absence of the superheated steam, after which the reaction mixture obtained is subjected to drying with superheated steam using the heat of neutralization generated.

DETAILED DESCRIPTION

As already mentioned, the teaching according to the invention sensibly links the salt formation stage of the synthesis of anionic surfactants with the possibility of directly converting the anionic surfactant formed into a substantially water-free dry product. Using the gas phase of the superheated steam as the medium for the neutralization reaction not only leads to a simplification of the process, it also affords a number of other advantages both in regard to the course of the process and in regard to the properties of the end product obtained.

In conventional spray neutralization, free-flowing, typically aqueous preparations on the one hand of the surfactant intermediates still bearing negatively charged hydrophilic groups and, on the other hand, the bases forming the required cations are finely sprayed, thoroughly mixed with one another in this stage and thus reacted. Spraying may be carried out, for example, with multicomponent nozzles or with separate nozzles for the respective product streams. In general, the intermixing process is supported by the additional introduction of air. It is known that, as an exothermic reaction, the neutralization reaction provides the reaction mixture with the equivalent amount of heat of neutralization which leads automatically to heating of the ultrafine droplets. The presence of air and, hence, oxygen which cannot be ruled out in the known process endangers the process in several ways. Firstly, there is the danger of unwanted ignitions—possibly leading to explosions—which is always present in industrial processes for the spray drying of organic materials of the type in question. Secondly, the presence of atmospheric oxygen and also the presence of carbon dioxide as a constituent of hot combustion gases can have an adverse effect on the product quality of the anionic surfactant salts.

Applicants' above cited earlier patent and patent applications concerned with the drying of useful materials and mixtures of useful materials of the type in question are based on the realization that the reliable exclusion of air and hot combustion gases by replacement thereof with superheated steam leads to a safe inert medium both in regard to the unwanted danger of fire or explosion and in regard to product quality. In addition, it is disclosed in the earlier applications that the solid material dried in the superheated steam as drying gas has important applicational advantages over comparable conventionally dried material, as reflected for example in the easier and improved solubility of the steam-dried material. For further particulars, the disclosure of applicants' earlier applications cited above may again be consulted in this regard.

The invention makes use of these advantages and, in doing so, facilitates the salt formation stage of the synthesis process. Comparatively high concentrations of the sprayed organic reactant phase may now be safely used in this stage. There is no longer any risk of unintentional and unwanted ignition. Even under the working conditions according to the invention, the rapid neutralization reaction generates the associated heat of neutralization in the reaction mixture which additionally promotes evaporation of the water introduced and the water formed by neutralization. This additionally benefits the drying process as a notional second step of the process according to the invention.

In the above-mentioned modification of the process according to the invention, the steps of neutralization and drying with superheated steam may also be combined with one another as follows using the heat of neutralization. The neutralization of the anionic surfactant intermediate(s) with the particular bases selected is initially carried out in the absence of superheated steam. It is advisable in this regard to use sufficiently fluid phases in at least one of the reactants used so that the anionic surfactant salts accumulate in a fluid and, for example, sprayable form in the auxiliary liquid. In general, the auxiliary liquid used is, above all, water. The fluid material is then delivered to the superheated-steam drying stage with optimal utilization of the heat of neutralization generated by salt formation. In the preferred embodiment, therefore, the two process steps are combined with one another in such a way that neutralization and subsequent drying with super-heated steam immediately follow one another. This sequence of process steps may readily be carried out continuously, for example by carrying out the neutralization step in a reaction tube to which the reactant streams to be reacted with one another are delivered. The outflow from this reaction tube is then directly delivered to the following drying stage using superheated steam.

The process according to the invention is suitable for use in the production of any of the typical anionic surfactant salts which are known in practice and described in the literature. Attention is specifically drawn at this juncture to this general knowledge of the expert. At the present time, the most important classes of interfacially active anionic surfactant salts include, in particular, corresponding carboxylates, sulfates, sulfonates, phosphates and/or phosphonates. The carboxylates may be of natural and/or synthetic origin. Carboxylates of natural origin are, for example, the corresponding fatty acid soaps.

Important anionic surfactant salts are based on sulfonation and/or sulfation products of oleophilic parent substances, parent substances containing saturated and/or unsaturated, linear and/or branched, aliphatic and/or cycloaliphatic or corresponding aromatic radicals being known starting materials for the introduction of residues of sulfuric acid. The sulfuric acid residue may be attached to the carbon chain either directly or even by way of intermediate atoms, particularly oxygen. The outcome of this derivatization of oleophilic parent compounds with sulfuric acid residues are the known sulfonates or sulfates. More particularly, however, corresponding derivatizations in the field of anionic surfactants are also possible—and known —with polybasic acids of phosphorus.

The free acid functions capable of salt formation in the context of the present invention in the anionic surfactant salts used in practice are reacted in particular with cations from the group of alkali metals, more particularly sodium and/or potassium, the alkaline earth metals, more particularly calcium and/or magnesium, with the ammonium ion or ammonia and/or with cations of organic ammonium compounds. The possibilities and classes of compounds covered by the teaching according to the invention encompass various representatives of this range.

The hydrophobic hydrocarbon radicals of anionic surfactants used in practice often contain about 6 to 30 and, preferably, about 8 to 20 carbon atoms, optimizations being possible in known manner—depending on the application envisaged—by displacement and adjustment of the HLB values established in the anionic surfactant and the resulting balance between oleophilic and hydrophilic properties. Thus, hydrophobic radicals containing more than 10 carbon atoms and, more particularly, 12 to 18 carbon atoms can be particularly important representatives for washing and cleaning purposes while hydrophobic radicals containing a smaller number of carbon atoms, for example about 6 to 12 carbon atoms and, more particularly, about 8 to 10 carbon atoms, are often preferred for cosmetic formulations. More particularly, attention is drawn at this juncture to the general specialist knowledge based on the extensive specialist literature and patent literature on the classes of compounds in question.

In the process according to the invention, the salt-forming anionic surfactant intermediates are preferably used in the form of free-flowing and sprayable solutions, emulsions and/or suspensions. Corresponding aqueous preparations which are delivered to the spray neutralization stage and are finely dispersed therein by suitable devices, for example by nozzle atomization and/or by disk atomization, are particularly suitable. The inorganic and/or organic bases are also preferably delivered in free-flowing form to the reaction zone filled with superheated steam. Aqueous preparations are particularly suitable in this case, too. For example, aqueous solutions of alkali metal hydroxides, particularly sodium hydroxide, may be used. The corresponding reactants based on alkaline earth metals may be used, for example, in the form of free-flowing suspensions of the hydroxides of, in particular, calcium and/or magnesium. The product streams are sprayed in a suitable form into the reaction zone filled with superheated steam and thoroughly mixed therein. The reaction zone may be formed, for example, by a spray drying tower in accordance with the teaching of applicants' earlier patents and patent applications cited above for the drying of useful materials using superheated steam as the drying gas. However, the process according to the invention is by no means confined to this particular embodiment of the primary reaction zone. The only important requirement for the first step of the neutralization reaction is of course the adequate intermixing of the finely divided reactant streams in the surrounding protective atmosphere filled with superheated steam. Since the combination of spray neutralization and subsequent drying represents a particularly simple embodiment of the process according to the invention, the practical application of the process under the conditions of the drying of aqueous anionic surfactant materials with super-heated steam is described hereinafter with reference to the disclosure of applicants' earlier patent applications cited above.

More particularly, the invention relates to a process for treating water-containing useful materials or mixtures of useful materials using superheated steam as drying gas which is circulated through the reaction and drying zone and is then recycled to the reaction and drying zone after removal of the evaporated water. In one preferred embodiment of the teaching according to the invention, the extra energy required for the evaporation of water, which has to be introduced into the process circuit over and above the heat of neutralization, is supplied at least by far predominantly and, preferably, solely by indirect heat exchange. In another preferred embodiment, the steam-filled system is operated under internal pressures in the region of normal pressure, although in one important embodiment such elevated pressures are applied in the circuit that air can be reliably prevented from entering the steam-filled circuit, for example in damaged areas which can never be completely ruled out in industrial plants.

In another, albeit generally less preferred embodiment, the additional energy required for the evaporation of water is supplied to the steam circuit at least partly by direct heating with heat of combustion.

As already mentioned, under the reaction and working conditions according to the invention, the treatment with the superheated steam may also be carried out on the one hand as spray drying and/or on the other hand as fluidized bed drying. Starting materials of comparatively high water content are subjected to the known spray drying technology. The spray drying process may be carried out in co-current or in countercurrent in correspondingly equipped spray drying towers.

Under the spray drying conditions, it is preferred in accordance with the invention indirectly to introduce the energy required for evaporation into the steam circuit at least predominantly outside the drying zone. This ensures that the fluid, wet starting material can be dried in fine particle form without the particles adhering significantly to one another or at least with controllable adjustment of the particle size. The energy introduced into the steam circuit outside the spray drying zone may be introduced in any known form of indirect heat transfer. The use of tube-bundle systems, through which heating gases of any origin on the one hand and—separately therefrom—the steam to be heated on the other hand flow, is mentioned as an example.

In one particularly important embodiment of the invention, this indirect introduction of energy into the steam circuit is carried out by one or more integrated burners with indirect transfer of heat to the steam, the hot combustion gases being directly introduced into the heat exchanger—integrated in the steam circuit—on the burner side. The temperature of the combustion gases may be, for example, in the range from about 400° to 1000° C. and, more particularly, is in the range from about 650° to 960° C. In the interests of optimal heat utilization and hence to reduce the costs of the process as a whole, it can be useful if the waste gases are also partly and, preferably, substantially completely circulated. For example, at least 30% by volume and preferably more than 40% by volume of the hot waste gases can be recirculated after leaving the integrated heat exchanger for the further utilization of energy. The quantity of waste gases recirculated preferably amounts to more than 60% by volume and often to around 70% by volume of the combustion gases introduced. The burner may be operated with any of the usual fuel gases, more particularly natural gas or comparable lower hydrocarbons or hydrocarbon mixtures and/or hydrogen.

If, on the other hand, the drying principle according to the invention is applied in fluidized bed drying, the necessary heating of the steam-based drying gas may be accomplished both outside the drying zone and with heat-exchanger elements integrated into the fluidized bed. These two gas heating mechanisms may also be combined with one another.

The preferred embodiment of the process according to the invention carried out at normal pressure provides for comparatively uncomplicated operation, even in industrial plants, with the necessary high throughputs per unit of time. The measure preferably applied in accordance with the invention of slightly elevating the internal pressure reliably prevents the unwanted entry of foreign gases, particularly air, into the steam-filled circuit. Secondary damage to the high product quality required can also thus be reliably prevented. Suitable working pressures are, for example, in the range up to about 150 mbar, preferably up to about 75 mbar and, more preferably, below 50 mbar excess pressure. The range from about 5 to 15 mbar excess pressure can be of particular advantage. Drying with superheated steam in accordance with the invention is of course also possible in principle at reduced pressures, particularly moderate reduced pressures, although in this case increased outlay on equipment is necessary for ensuring the absence of possible damaged areas in the circuit which could initiate the unwanted penetration of air.

In other respects, the process according to the invention may largely be carried out in accordance with applicants' DE-A 40 30 688 cited at the beginning for drying the mixtures of useful materials in question with superheated steam as the drying gas. To complete the disclosure of the invention, the relevant passages of that earlier application are reproduced herein where necessary:

In the earlier application, the fact that optimal drying results by the action of hot steam in the end product of the process are not essential is regarded as crucial to understanding the teaching of drying mixtures of useful materials of the type in question with superheated steam. Basically, the same also applies to the teaching according to the invention. However, it has been found that, providing such troublesome factors as waste gases and air or oxygen are reliably ruled out, even mixtures which, under conventional drying conditions with hot gases, tended to enter relatively quickly into unwanted reactions, for example discoloration, encrustation and the like, are comparatively immune to temperature. For drying with superheated steam, this means that safe operation both with superheated steam at comparatively high temperatures and degrees of drying to minimal residual moisture contents are possible without any adverse effect on the quality of the end product. Thus, residual moisture contents distinctly below 1% by weight, for example down to about 0.5% by weight or even lower, can be established in the dry material. At the same time, working temperatures of the used steam issuing from the drying zone above 100° to 110° C., preferably above 150° C. and, more preferably, above 180° C. can be applied. Nevertheless, even fairly significant residual moisture contents can be tolerated providing the composition of the material ensures that the residual water is bound by a form of "internal drying" to such an extent that the long-term pourability and free flow of the dry material is guaranteed.

If, through the design of the particular drying installation used, fine powder is obtained as the primary product of spray neutralization and subsequent drying, it may be desirable so far as the subsequent use of the anionic surfactant salts is concerned, for example for process-related reasons, to convert the powder into a coarser material. This may be done by any of the methods known from the relevant technical field. Conversion of the powder into agglomerates may be carried out in a separate following second process step, for example using powder granulators which may be regarded as pure separate shaping processes.

However, processes which enable a comparatively coarse-particle material to be formed in an integrated process cycle are of particular interest. In this case, too, various options are available from the relevant drying technology, including spray drying with integrated agglomeration and the technology of fluidized bed spray granulation. The two types of process differ above all in the form of product which is produced in the process. Spray drying with an integrated fluidized bed produces irregularly shaped agglomerates—typically of the order of 0.3 to 1.5 mm in size—because the primary particles formed during spray drying adhere to one another. The compact agglomerates produced by fluidized bed spray granulation can reach sizes of up to 30 mm for example. They are additionally distinguished by a very fine pore structure under conventional working conditions. The embodiment of the invention under discussion here is characterized in particular in that this particle agglomeration step is also carried out under the effect of the superheated steam as gas phase. In this way, the porosity of the agglomerates also is further improved, cf. the relevant observations in applicants' above-cited earlier patent applications in the field in question. Information on combinations of spray drying and spray agglomeration/spray granulation can be found in the relevant specialist literature, including in particular the article by D. Gehrmann entitled "Entwicklungstendenzen der Trocknungstechnik in der chemischen Industrie", Chem.-Ing.-Tech. 62 (1990) No. 10, A 512 to A 520, more particularly subchapter 2.1 and the technologies described in detail therein.

The teaching of the present invention also encompasses the elements which are the subject of earlier German/patent application P 42 06 050.8 cited above. This earlier application relates to low-dust anionic surfactant concentrates in powder or granule form with improved solubility in aqueous media. The teaching of the present invention extends the disclosure of that earlier application to the intermediate stage of carrying out the spray neutralization step in the formation of anionic surfactants in superheated steam as an inert gas.

The elements described in earlier application P 42 06 050.8 may also be used within the scope of the present teaching. It is again pointed out that the disclosure of that earlier application is included herein as part of the disclosure of the present invention. Accordingly, particularly characteristic elements and instructions with respect to procedure from the earlier application are mentioned once more in the following.

In one preferred embodiment, the content of washing- or cleaning-active surfactants in the anionic surfactant concentrates according to the invention is at least about 20% by weight and preferably of the order of at least 30% by weight (based on fine-particle solids). Basically, the surfactant solid as such may form the powder particles or granules. In practice, however, it is important to bear in mind the fact that, in general, limited quantities of residual components (inorganic salts, non-sulfonated residues and the like) are present as acceptable or rather irrelevant impurities in the surfactant solids from the production of the anionic surfactants on an industrial scale. According to the invention, therefore, surfactant granules having an active content of anionic surfactants in the range from about 35 to 95% by weight are particularly preferred. Within this range, those substances or mixtures of substances in which the surfactant components make up more than 50% by weight (based as before on fine-particle solids) may be preferred.

The anionic surfactant components present in these solids may be certain individual useful materials of the type mentioned, although virtually any mixtures of useful materials from the class of surfactants under discussion may also be present. The expression "surfactant mixture" may be interpreted in various ways: even within a selected class, for example fatty alcohol sulfates and/or fatty acid sulfonates, there is generally no individualized substance in the sense of a selected compound. The processing of the starting materials of vegetable and/or animal origin and the processing of corresponding synthetic starting chemicals leads to useful materials of the type in question which fall within a certain band in their composition, for example regarding the number of carbon atoms in the fatty alcohol and/or fatty acid components.

However, the expression "surfactant mixtures" in the context of the definition according to the invention also encompasses the specific combination of anionic surfactants of basically different structure. Thus, it may be useful, for example, to blend conventional washing-active TAS-based tallow alcohol sulfate anionic surfactants with anionic surfactant dispersants which may be based, for example, on comparatively short-chain sulfates and/or sulfonates. Other examples of at least two different types of anionic surfactant are mixtures of, on the one hand, disalts, i.e. α-sulfofatty acid salts, for example having a chain length of $C_{14}$ to $C_{20}$, and on the other hand anionic surfactants based on TAS and/or on alkyl ether sulfonates, particularly MES. (methylether sulfonate).

The invention solves the problem of providing dust-free powders and/or granules in two ways which may even be used in combination with one another. The first is based on the proposal of making specific use of the residual water content of the material to be dried. Depending on the quality of the particular solid material present, freedom from dust can be at least largely established by regulating the water content of the dry material.

In one important embodiment of the invention, however, the anionic surfactant concentrates may contain added components in varying amounts which should primarily be regarded in the context of the problem addressed by the invention of eliminating dust formation, i.e. as dust-binding auxiliaries. In this embodiment, the invention specifically encompasses the incorporation of these auxiliaries which, in turn, represent useful materials for use in detergents and/or cleaning products in conjunction with the particular anionic surfactant components in question.

In this embodiment, the fine-particle, pourable and free-flowing anionic surfactants according to the invention are characterized in that they contain as the dust-binding auxiliaries and/or useful materials mixture components—preferably in the form of a homogeneous mixture—which are liquid and/or at least tacky at room temperature, optionally in the presence of limited quantities of residual water, and which are preferably incorporated in the surfactant concentrate in such quantities that the necessary freedom from dust is guaranteed without a lasting adverse effect on pourability and free flow.

Suitable dust-binding auxiliaries are, in particular, mixture components in the form of monomer compounds, oligomer compounds and/or suitably selected polymer compounds which, in particular, are soluble, emulsifiable and/or swellable in water at room temperature. Before characteristic examples of such auxiliaries or useful materials as mixture components are discussed, the concept on which the teaching according to the invention is based in this regard will be explained: by virtue of their solubility or emulsifiability in water and, in any event, by virtue of their swellability in water, the auxiliaries may be homogeneously incorporated in the mixture of active substances based on anionic surfactants to be dried. If, in the subsequent drying step using superheated steam from applicants' earlier applications cited at the beginning and to complete the disclosure of the present invention, the water-containing starting material is then dispersed in the superheated steam in the form of particles, more particularly fine particles, and dried under the effect of the superheated steam, the dust-binding auxiliaries are reliably and uniformly incorporated in uniform distribution in each particle. By virtue of the liquid, viscous or at least tacky consistency of the auxiliary, the dust-binding effect of the additive in question comes to the fore in the ultimately dried particles. On the other hand, by suitably selecting the quantities in the mixture of active substances used, it is possible to ensure that the desired state of tack-free pourability or free flow remains intact, even over prolonged periods of storage. The mixing ratios to be established in each particular case can readily be determined by simple tests taking relevant specialist knowledge into consideration.

Characteristic representatives of the dust-binding auxiliaries or useful materials suitable for mixing with the anionic surfactant components are mentioned in the following:

Suitable water-soluble components fluid under normal conditions are polyhydric alcohols of low volatility and oligomers thereof. For reasons of cost alone, glycerol and corresponding oligoglycerols are particularly important in this regard. Such mixture components as oligomers and/or polymers of ethylene glycol and/or propylene glycol are further examples of corresponding compounds which are capable of flowing freely and/or at least of imparting sufficient tackiness under the effect of residual water. More particularly, polyethylene glycols, for example having a molecular weight of up to about 10,000 and preferably up to about 7,000, can be useful materials in the context of the teaching according to the invention which—in the same way as the above-mentioned representatives glycerol and/or oligoglycerol—not only have the desired dust-binding effect, they also act as solubilizers and/or useful materials for detergents and cleaning products. However, other typical representatives of suitable auxiliaries are mono- and/or oligoglycosides such as, for example, glucose, oligoglucoses, sugars, such as sucrose, or corresponding sugars or sugar compounds encompassing larger numbers of rings up to corresponding polymer compounds of the starch and/or partly degraded starch and starch derivative type. All compounds of this type are distinguished by more or less pronounced tackiness, particularly in the presence of small quantities of water. In the practical application of the detergents and cleaning products, these components which are present in very low concentrations are directly absorbed by the aqueous wash liquors and do not interfere with the desired washing and cleaning processes.

Other suitable mixture components for reliable elimination of the dust problem are oligomeric and/or polymeric mixture components which, in turn, are preferably at least swellable and/or even soluble in water. In this case, too, there are a large number of representatives of such components to which considerable significance is attributed in the context of standard detergents and cleaning products. Examples are polyvinyl pyrrolidone (PVP), polyvinyl alcohol (PVA), polycarboxylate compounds, more particularly of synthetic origin, which may be obtained for example by polymerization or copolymerization of (meth)acrylic acid and maleic acid or maleic anhydride and which play an important role as so-called builder components in modern laundry detergents. Another important example of the last-mentioned class of compounds are carboxyfunctional oligo- or polyglycoses which may be obtained by selective oxidation of starch with introduction of the carboxyl group in the 6 position of the glucose ring. Also suitable are corresponding water-soluble and/or water-swellable cellulose derivatives, such as methyl cellulose, carboxymethyl cellulose, hydroxyalkyl celluloses, such as hydroxyethyl cellulose and the like.

The representatives mentioned thus far purely by way of example may be complemented and/or replaced by any other mixture components having the stated properties, more particularly adequate solubility or swellability in water and adequate non-volatility under the working-up conditions in superheated steam. Relevant specialist knowledge may be applied in this regard also.

A certain other class of auxiliaries is separately discussed in the following: other suitable mixture components are, in particular, nonionic surfactants which flow freely or are sufficiently tacky under normal temperature conditions but which cannot be assigned to the above-described nonionic surfactants based on glycoside ethers or esters. The class of fatty alcohol ethoxylates containing for example 2 to 40 EO units and, more particularly, 2 to 20 EO units in the molecule and corresponding ethoxylates of fatty acids, fatty amines, carboxylic acid amides and/or alkanesulfonamides are mentioned purely by way of example. The special teaching of applicants' DE 40 30 688 mentioned at the beginning names many important subclasses and special types as examples of such nonionic surfactant components in connection with the drying process disclosed therein using superheated steam. The teaching of the present invention goes beyond the disclosure of the earlier application by using suitable nonionic surfactant components with sufficient free flow or tackiness in the presence of residual water for safely binding unwanted dust in the end product and, at the same time, enabling the anionic surfactants hitherto accessible solely as high-dust preparations in the form of fine powders to be made available in high solids concentrations.

Particularly important anionic surfactant compounds for the teaching of the invention are fatty alcohol sulfates, fatty alcohol ether sulfates, olefin and/or alkane sulfonates, fatty acid ester sulfonates, sulfonated fatty acid triglycerides and/or glycerol fatty acid partial ester sulfates. Another important example of anionic surfactants in the context of the teaching according to the invention are succinic acid semiester sulfonates of which the ester group contains a sufficiently oleophilic residue, for example a $C_{6-20}$ and, more particularly, $C_{10-16}$ fatty alcohol radical. Particularly important representatives of the fatty acid ester sulfonates are the known anionic surfactants based on α-sulfofatty acid lower alkyl esters or salts thereof, of which the most important representatives are again the α-sulfofatty acid methyl esters (MES). Characteristic representatives of fatty acid sulfonates are α-sulfofatty acids and washing- or cleaning-active salts thereof which are known among experts as "disalts" and which can be obtained from free fatty acids and/or from corresponding α-sulfofatty acid esters by ester cleavage. Sulfonated fatty acid triglycerides are known to be reaction products of natural fats and/or oils with, in particular, $SO_3$ which are obtained as multicomponent mixtures of sulfates and sulfonates and which are described, for example, in applicants' German patent applications DE 39 36 00 and 39 4 365.

The washing- and/or cleaning-active anionic surfactants are typically present in the form of their alkali metal and/or ammonium salts or as soluble salts of organic bases. The sodium salts and corresponding potassium salts are particularly important alkali metal salts.

The teaching of the invention encompasses the mixture of anionic surfactant compounds and mixtures thereof with the mixture components, particularly organic components, listed in the foregoing, even in admixture with inorganic mixture components. The components in question are preferably corresponding components selected from typical constituents of detergents and/or cleaning products which are also homogeneously incorporated in the powders and/or granules. Examples of such water-soluble inorganic mixture components are water-soluble salts, such as sodium carbonate, sodium bicarbonate and/or sodium sulfate and also water-soluble sodium silicates, more particularly the waterglasses typical of detergents and cleaning products. In addition to or instead of these water-soluble inorganic components, water-insoluble mixture components may be incorporated in the powder-form anionic surfactant agglomerates. Examples of water-insoluble mixture components are synthetic zeolite compounds, more particularly detergent-quality zeolite NaA which has a calcium binding power of 100 to 200 mg CaO/g, as determined in accordance with DE 24 12 837. The special quality of anionic surfactant concentrates compounded in accordance with the invention is illustrated precisely by the use of these insoluble inorganic constituents: if, for example, TAS is subjected together with zeolite NaA to a conventional spray drying process, the washing-active TAS component is absorbed so firmly and in such a thin layer onto the zeolite particles that, in subsequent application, washing power can no longer be developed to anywhere near its full extent in the wash liquor. In the anionic surfactant concentrates defined in accordance with the invention and produced in accordance with the teaching of the invention, this negative effect of adding zeolite is non-existent or at least greatly reduced. Further examples of possible water-insoluble mixture components are fine-particle swellable layer silicates of the montmorillonite type, for example bentonite.

Particulars of possible embodiments of the superheated steam drying process can be found in applicants' earlier German patent applications as cited above, more particularly in German patent applications P 42 04 035.3 and P 42 04 090.6. To complete the disclosure of the present invention, a selection of particularly important process parameters from those earlier applications is discussed in the following:

The working conditions of the process according to the invention enable high temperatures to be used for the circulated steam phase in the drying step of the spray drying process. The working temperatures of the steam used are generally above 150° C. and preferably at least about 200° C. in the gas phase. Working temperatures of 250° C. and higher can be particularly interesting and even temperatures of at least 300° C. and more particularly in the range from 300 to 380° C may be applied. In many cases, working temperatures in the range from about 270° to 350° C. in the steam phase are particularly suitable. All these temperature values relate to the temperature of the steam heated to optimal temperature which is delivered to the spray drying zone in co-current or countercurrent. The temperature of the steam falls in known manner during its contact with the wet or moist material. Considerations based largely on energy factors, including the intended subsequent use of the steam to be removed from the circuit, determine the quantitative ratios between the quantity of water to be evaporated and the quantity of superheated steam delivered. Embodiments which provide only for a limited reduction in the steam temperature after leaving the spray drying zone to values in the range from about 190 to 250° C. are possible in this regard whereas, in other embodiments, the thermal energy of the steam can advantageously be further utilized to reduce the temperature of the steam to the vicinity of the condensation temperature under process conditions (100° to 110° C.). More specifically, these details are determined inter alia by the design of the recycle process as a whole. Corresponding considerations apply to the use of superheated steam as the hot gas in an optional after-treatment stage, for example by the fluidized bed process or any other optionally integrated, agglomeration process. The figures mentioned above apply in this case also.

EXAMPLES

Example 1

The spray neutralization was carried out in a Niroatomizer experimental spray drying tower of the "minor production" type coupled to a reaction tube.

In a horizontally arranged reaction tube (length 100 cm, diameter 10 cm) equipped with a stator/rotor mixer, a $C_{16/18}$ α-sulfonated tallow fatty acid having a degree of sulfonation of 89.6% was first contacted with an aqueous 25% by weight sodium hydroxide solution, the molar ratio of sulfo acid to NaOH, based on the solids, being 1:2.2. The components were introduced through a multicomponent mixing nozzle at the head of the reactor at room temperature and neutralized with intensive mixing.

The outlet of the reaction tube was coupled to the experimental spray drying tower so that, after neutralization, the low-viscosity slurry of the sulfofatty acid sodium salt intermediately formed (dry matter content approx. 37% by weight) was converted in the presence of superheated steam into a surfactant powder having an apparent density of 370 g/l.

The following operating parameters were established:

| | |
|---|---|
| Rotational speed of the rotating disk atomizer: | 25,000 r.p.m. |
| Steam temperature, entry | approx. 300° C. |
| Steam temperature, exit | approx. 200° C. |
| Tower reduced pressure | 16 mbar |
| Feed temperature | 80° C. |
| Feed rate | 8 to 18 kg/h |
| Steam volume | 500 m³/h |

The product had a dry matter content of 99.8% by weight and an apparent density of 370 g/l. It showed very favorable solubility on addition of water.

Example 2

Example 1 was repeated using an acidic semiester of sulfuric acid with $C_{16/18}$ tallow alcohol and an aqueous 25% by weight potassium hydroxide solution, the molar ratio of acidic ester to KOH during neutralization, based on solids, being 1:1.1. The product had a dry matter content of 99% by weight and an apparent density of 290 g/l.

Example 3

Example 1 was repeated using a $C_{16/18}$ α-sulfonated fatty acid methyl ester and an aqueous 25% by weight sodium hydroxide solution, the molar ratio of acidic ester to KOH during the neutralization—based on solids—being 1:1.25. The product had a dry matter content of 98% by weight and an apparent density of 295 g/l.

We claim:

1. A process for the production of wetting-, washing- or cleaning-active anionic surfactant salts comprising reacting inorganic or organic bases with anionic surfactant intermediates containing hydrophilic negatively charged groups attached to hydrophobic groups by combining a spray of said bases and said anionic surfactant intermediates to form salts of said anionic surfactant intermediates selected from the group consisting of carboxylates, sulfates, sulfonates, phosphates and phosphonates, and then introducing said spray into an inert gas phase consisting of superheated steam whereby said spray is at least partly dried.

2. The process as in claim 1 wherein said anionic surfactant salts are formed with cations selected from the group consisting of alkali metals, alkaline earth metals, ammonia and organic ammonium compounds.

3. The process as in claim 1 wherein water-soluble or water-dispersible anionic surfactant salts are formed, said hydrophobic hydrocarbon groups contain 6 to 30 carbon atoms and said salts contain sodium, potassium, ammonium or organically substituted ammonium as cations.

4. The process as in claim 1 wherein said salt-forming anionic surfactant intermediates are introduced as a spray in the form of free-flowing and sprayable solutions, emulsions or suspensions.

5. The process as in claim 1 wherein said inorganic or organic bases are introduced as a spray in the form of free-flowing aqueous preparations.

6. The process as in claim 1 wherein said anionic surfactant salts are converted by said superheated steam into pourable and free-flowing dry products.

7. The process as in claim 1 wherein the produced anionic surfactant salts are selected from the group consisting of fatty alcohol sulfates, fatty alcohol ether sulfates, olefin and alkane sulfonates, fatty acid ester sulfonates, fatty acid sulfonates, succinic acid semi-ester sulfonates, salts of sulfonated fatty acid triglycerides and glycerol/fatty acid partial ester sulfates.

8. The process as in claim 1 wherein the dried anionic surfactant salts comprise pourable and free-flowing products having apparent densities of at least about 150 g/l.

9. The process as in claim 1 wherein a substantially dust-free pourable and free-flowing material is formed by adding to said salts a dust-binding auxiliary or by regulation of the residual water content of said salts.

10. The process as in claim 1 wherein, in a multistage process, spray neutralization and spray drying to form a free-flowing powder are carried out in a first step and the powder thus formed is subsequently agglomerated into agglomerates of relatively large particle diameter, the agglomeration step being carried in the presence of an inert gas phase consisting of superheated steam and optionally being combined with the preceding spray neutralization and drying step.

11. The process as in claim 8 wherein the free flowing product produced have a content of washing- or cleaning-active anionic surfactant salts of at least about 20% by weight, based on the weight of said free flowing product.

12. The process as in claim 9 wherein said dust-binding auxiliary is incorporated in said anionic surfactant salts in sufficient quantity that the absence of dust is guaranteed without any adverse effect on pourability and free flow of said salts.

13. The process as in claim 12 wherein said dust-binding auxiliary is selected from the group consisting of monomeric, oligomeric and polymeric compounds which are soluble, emulsifiable or swellable in water at room temperature, glycerol, oligoglycerols, polyethylene glycols, polypropylene glycols, mono- and oligoglycosides and corresponding glycoside compounds, polyvinyl pyrrolidone, polyvinyl alcohol, polycarboxylates, cellulose derivatives, and nonionic surfactants.

14. The process as in claim 1 wherein a mixture of at least two different types of anionic surfactants are formed during the spray neutralization step.

15. The process as in claim 1 wherein fine-particle anionic surfactant salt concentrates are formed which in addition contain inorganic detergent mixture constituents.

16. The process as in claim 1 including adding to said anionic surfactant salts water-soluble inorganic components selected from the group consisting of sodium carbonate, sodium sulfate and waterglass.

17. A process for the production of wetting-, washing- or cleaning- active anionic surfactant salts selected from the group consisting of carboxylates, sulfates, sulfonates, phosphates and phosphonates comprising reacting inorganic or organic bases with anionic surfactant intermediates containing hydrophilic negatively charged groups attached to hydrophobic hydrocarbon groups, and then spray drying the reaction mixture in an inert gas phase consisting of superheated steam.

18. The process as in claim 17 wherein said spray drying step is conducted at a temperature of from about 100° C. to 450° C.

19. The process as in claim 17 wherein said anionic surfactant salts are formed with cations selected from the group consisting of alkali metals, alkaline earth metals, ammonia and organic ammonium compounds.

20. The process as in claim 17 wherein said anionic surfactant salts are selected from the group consisting of fatty alcohol sulfates, fatty alcohol ether sulfates, olefin and alkane sulfonates, fatty acid ester sulfonates, fatty acid sulfonates, succinic acid semi-ester sulfonates, salts of sulfonated fatty acid triglycerides, and glycerol/fatty acid partial ester sulfates.

* * * * *